United States Patent [19]

Makita

[11] Patent Number: 4,950,044

[45] Date of Patent: Aug. 21, 1990

[54] OPTICAL SEMICONDUCTOR DEVICE FOR DEMULTIPLEXING WAVELENGTH MULTIPLEXED LIGHTS

[75] Inventor: Kiko Makita, Tokyo, Japan

[73] Assignee: NEC Corporation, Tokyo, Japan

[21] Appl. No.: 246,060

[22] Filed: Sep. 19, 1988

[30] Foreign Application Priority Data

Sep. 17, 1987 [JP] Japan ............................. 62-234324

[51] Int. Cl.$^5$ ............................................. H04J 14/02
[52] U.S. Cl. ............................. 350/96.14; 350/96.15; 370/3
[58] Field of Search ............... 350/96.13, 96.14, 96.15, 350/96.16; 357/30 R, 30 E; 370/1, 3, 4

[56] References Cited

U.S. PATENT DOCUMENTS

| 4,665,421 | 5/1987 | Borner et al. | 357/30 R |
| 4,799,749 | 1/1989 | Börner et al. | 350/96.13 |
| 4,826,295 | 5/1989 | Burt | 370/4 X |

OTHER PUBLICATIONS

Larson et al, "High-Speed Dual-Wavelength Demultiplexing . . . Detector Array", Apply. Phys. Lett., 49 (5), Aug. 1986, pp. 233-235.

"Gigahertz–Bandwidth InGaAsP/InP . . . Waveguides", Reprinted from Electronic Letters, 13th Sep., 1984, vol. 20, No. 19, pp. 790-792.

Primary Examiner—John D. Lee
Attorney, Agent, or Firm—Sughrue, Mion, Zinn, Macpeak & Seas

[57] ABSTRACT

An optical semiconductor device for demultiplexing wavelength multiplexed lights utilizes a plurality of waveguides including a superlattice structure, a plurality of directional couplers for coupling two neighboring waveguides among the plurality of waveguides, and a plurality of electrodes for applying different voltages to the plurality of waveguides. When the different voltages are applied to the plurality of waveguides, light having a first wavelength is absorbed in a first waveguide among the plurality of waveguides, while the other remaining lights are waveguided through the first waveguide and transferred through a first directional coupler among the plurality of directional couplers to a second waveguide among the plurality of waveguides. In the second waveguide, light having a second wavelength is absorbed and the other remaining lights are waveguided therethrough. Thus, the wavelength multiplexed lights are demultiplexed and detected therein.

4 Claims, 4 Drawing Sheets

OPTICAL SEMICONDUCTOR DEVICE FOR DEMULTIPLEXING WAVELENGTH MULTIPLEXED LIGHTS

FIELD OF THE INVENTION

The invention relates to an optical semiconductor device for demultiplexing wavelength multiplexed lights, and more particularly to an optical semiconductor device in which wavelength multiplexed lights are demultiplexed and detected.

BACKGROUND OF THE INVENTION

In an optical communication system, light having a predetermined wavelength is modulated with signals to be propagated through a transmission optical fiber. Recently attention has been paid to a wavelength multiplexed communication system in which lights having different wavelengths are propagated to enhance the density of signals and the transmission speed. In such a communication system, lights having different wavelengths are radiated from light emitting devices, and the lights which are multiplexed in an optical coupler are demultiplexed and detected in a photo-detecting device.

As a photo-detecting device which is applied to such an optical communication system, a PIN type photo-detector is known which includes an optical absorption layer of $In_{0.53}Ga_{0.47}As$ having lattice matching on an InP substrate as described on pages 653 and 654 of "Electron. Lett. 1984, Vol. 20". Also known is an avalanche multiplication type photo-detector as described on pages 257 and 258 of "IEEE, Electron Device Lett. 1986, Vol. 7". The PIN type photo-detector has an advantage in that its capacitance value is small and the fabrication process thereof is easy; the avalanche multiplication type photo-detector has an advantage in that the internal gain effect is expected in it and the high speed response is obtained.

In operation, when light having an energy greater than a band energy of the optical absorption layer is supplied to a light receiving portion to be absorbed therein, electrons and holes are induced therein so that the transit of carriers is realized to produce an electric current signal in accordance with the application of a reverse bias.

However, there is a disadvantage in the above described photo-detectors in that it is difficult to demultiplex and detect optical multiplexed signals having different wavelengths for the structural reason that the photo-detector is used in the form of one chip device. This is because it is not easy in the structure of the photo-detector to discriminate the electric current produced therein in accordance with its wavelength.

In such a situation, a two-wavelength demultiplexing superlattice PIN waveguide detector in which two lights having different wavelengths are demultiplexed and detected has been proposed by A. Larsson et al as described on pages 233 to 235 of Appl. Phys. Lett. 49(5), 4 Aug. 1986". The two-wavelength demultiplexing superlattice PIN waveguide detector comprises a substrate of n-GaAs, and an n-AlGaAs layer, a superlattice structure consisting of n-GaAs layers/n-AlGaAs layers, a p-AlGaAs layer, and a p-GaAs layer grown successively on the substrate wherein two waveguide regions are defined in the p-AlGaAs and GaAs layers in accordance with the formation of the proton implantation region, which electrical resistance is increased by the proton implantation at a region other than the waveguide regions, and further comprises two electrodes for applying different voltages to the two waveguide regions separately, and an electrode provided on the bottom surface of the substrate.

In operation, the lights having two different wavelengths is supplied to the PIN waveguide detector. When one of the lights s absorbed in the waveguide layer, the light is converted to electric current. In this stage, whether the light is absorbed therein or is waveguided therethrough is determined dependent on the absorption edge energy of the waveguide layer. That is, if the light is of an energy larger than the absorption edge energy, in other words, if the light is on the short wavelength side, the light is absorbed. On the other hand, if the light is of an energy lower than the absorption edge energy (on the long wavelength side), the light is waveguided through the waveguide layer.

The PIN waveguide detector is characterized in that the layer for an optical absorption and waveguide has a superlattice structure including wells and barriers. In this regard, an absorption edge energy of the superlattice structure is different from that of a widely used bulk structure. In more detail, the absorption edge energy E of the superlattice structure is greater in accordance with the quantum level of holes and electrons in the superlattice structure than the absorption edge energy $E_g$ of the bulk structure. This is expressed in the equation (1).

$$E = E_g + \left(\frac{\pi \hbar}{\sqrt{2}\, l}\right)^2 \left(\frac{1}{m_n} + \frac{1}{m_p}\right) \tag{1}$$

where l is a thickness of well layers, $E_g$ is a band energy for a bulk structure, $m_n$ is a mass of electron, $m_p$ is a mass of hole, and $\hbar$ is defined as $$\hbar = \frac{h}{2\pi}$$

where h is a Planck constant.

Here, it is assumed that an electric field is applied across the superlattice. This results in the spatial separation between electrons and holes in a well layer. As a result, a phenomenon called "Stark effect" in which the band energy becomes lower when an electric field applied than when no electric field applied is observed. The absorption edge energy is largely varied dependent on the applied electric field whereby the wavelength demultiplexing and detection is realized in the vicinity of an absorption edge.

According to the above described two-wavelength demultiplexing superlattice PIN waveguide detector, however, there are following disadvantages.

First, the formation of the high-resistance region is not easily realized by the proton implantation. For this reason, electrical crosstalk is inevitably induced between the waveguide regions. Furthermore, the proton implantation is liable to cause the introduction of defects into the detector. Such defects must be absolutely avoided in an optical communication device in which reliability is regarded the most important requirement.

Second optical confinement is not efficiently realized in a coupling region between the waveguide regions. This causes a coupling loss of waveguided lights. For the purpose of reducing the coupling loss, it is considered that the distance between the waveguide regions is shortened. However, this causes the increase of the aforementioned electrical crosstalk.

SUMMARY OF THE INVENTION

Accordingly, it is an object of the invention to provide an optical semiconductor device for demultiplexing wavelength multiplexed lights in which the electrical crosstalk is reduced or not induced.

It is a further object of the invention to provide an optical semiconductor device for demultiplexing wavelength multiplexed lights, in which reliability is increased by avoiding the introduction of defects.

It is a still further object of the invention to provide an optical semiconductor device for demultiplexing wavelength multiplexed lights in which the coupling loss of waveguided lights is decreased.

According to the invention, an optical semiconductor device for demultiplexing wavelength multiplexed lights comprises a plurality of waveguides on a common substrate. Each of the waveguides includes first to third semiconductor layers. The second semiconductor layer is of a larger refractive index and a lower absorption edge energy than the first semiconductor layer, and includes a superlattice structure which functions as an optical absorption and waveguide layer. The third semiconductor layer is of a lower refractive index and a larger absorption edge energy than the second semiconductor layer. The waveguides are coupled by a plurality of directional couplers.

BRIEF DESCRIPTION OF THE DRAWINGS

The invention will be explained in more detail in conjunction with appended drawings wherein.

DESCRIPTION OF PREFERRED EMBODIMENTS

Figure 1:
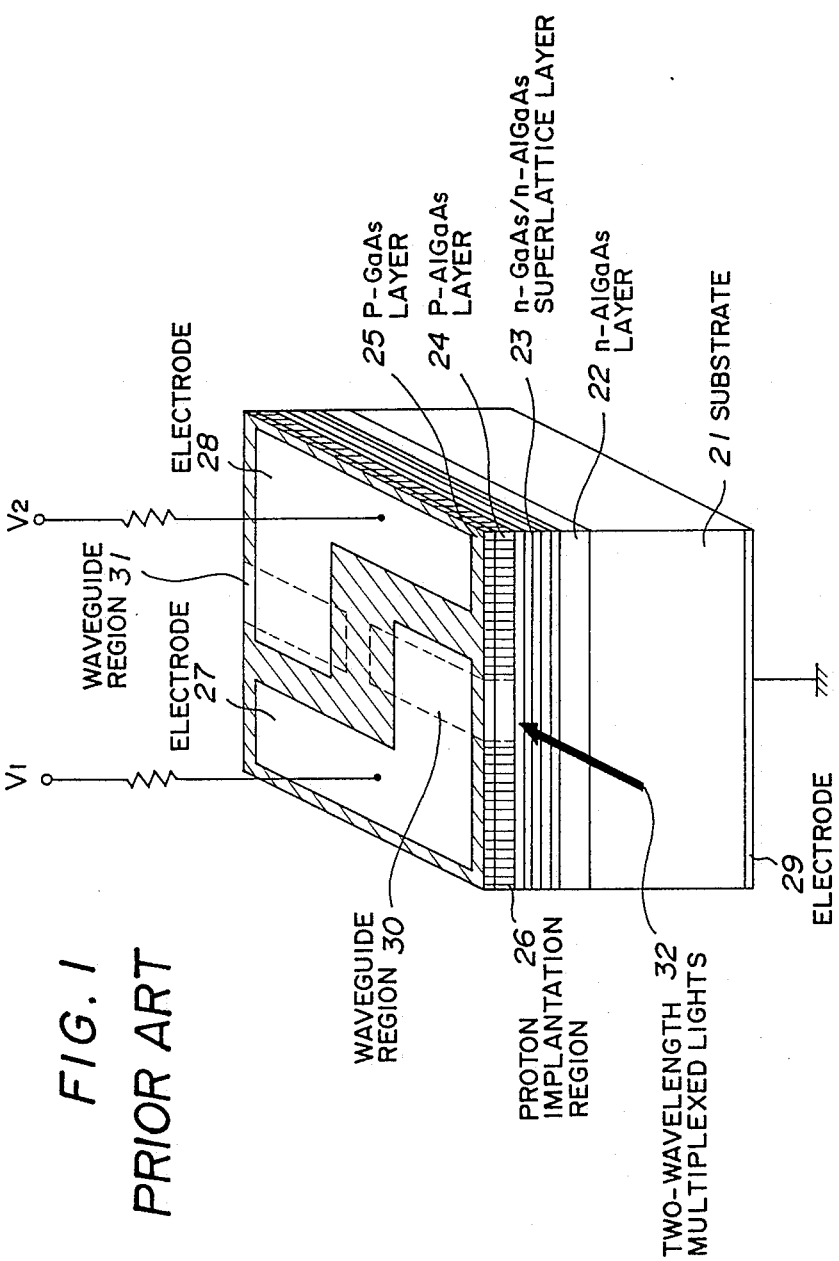
FIG. 1 is a perspective view showing a conventional two-wavelength demultiplexing superlattice PIN waveguide detector.

Before explaining an optical semiconductor device for demultiplexing wavelength multiplexed lights according to the invention, the aforementioned two-wavelength demultiplexing superlattice PIN waveguide detector will be explained FIG. 1 shows the two-wavelength demultiplexing superlattice PIN waveguide detector which comprises a substrate 21 of n-GaAs, and an n-AlGaAs layer 22, a superlattice structure 23 consisting of n-GaAs layers/n-AlGaAs layers, a p-AlGaAs layer 24, and a p-GaAs layer 25 grown successively on the substrate 21 wherein optical waveguide regions 30 and 31 are defined in accordance with the formation of proton implantation regions 26, which electrical resistance is increased by the proton implantation at a region other than the waveguide regions 30 and 31, and further comprises electrodes 27 and 28 for applying different voltages $V_1$ and $V_2$ to the waveguide regions 30 and 31, and an electrode 29 provided on the bottom surface of the substrate 21.

In operation, the two different voltages $V_1$ and $V_2$ are applied to the waveguide regions 30 and 31 so that a short wavelength light of the incident lights 32 is absorbed in the waveguide region 30, while a long wavelength light of the incident lights 32 is waveguided through the waveguide region 30 and then absorbed in the waveguide region 31. This is because the absorption edge energy is dependent on an applied electric field as explained by the Stark effect. Thus, the demultiplexing and detection of two wavelengths can be realized as reported in the aforementioned letter.

Figure 2:
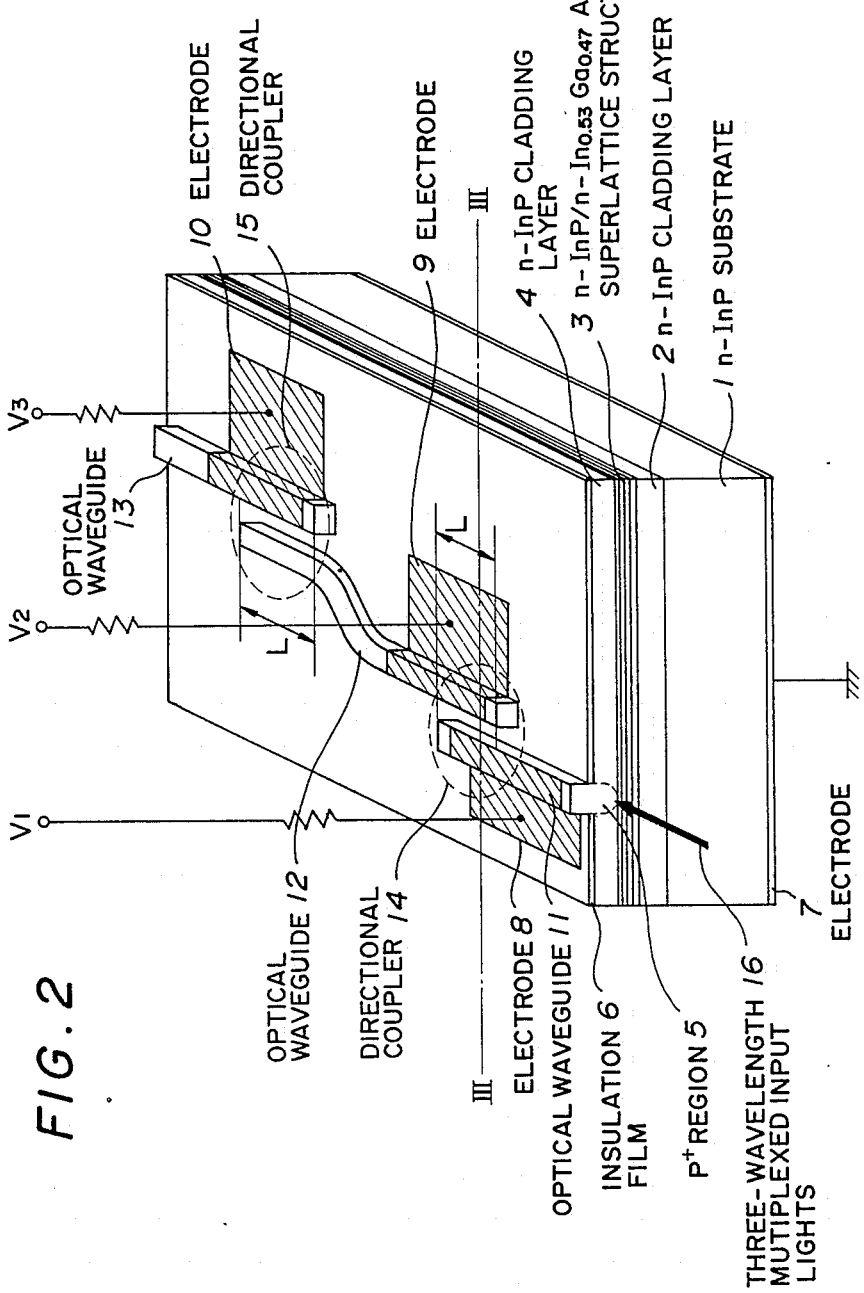
FIG. 2 is a perspective view showing an optical semiconductor device for demultiplexing wavelength multiplexed lights in an embodiment according to the invention.
Figure 3:
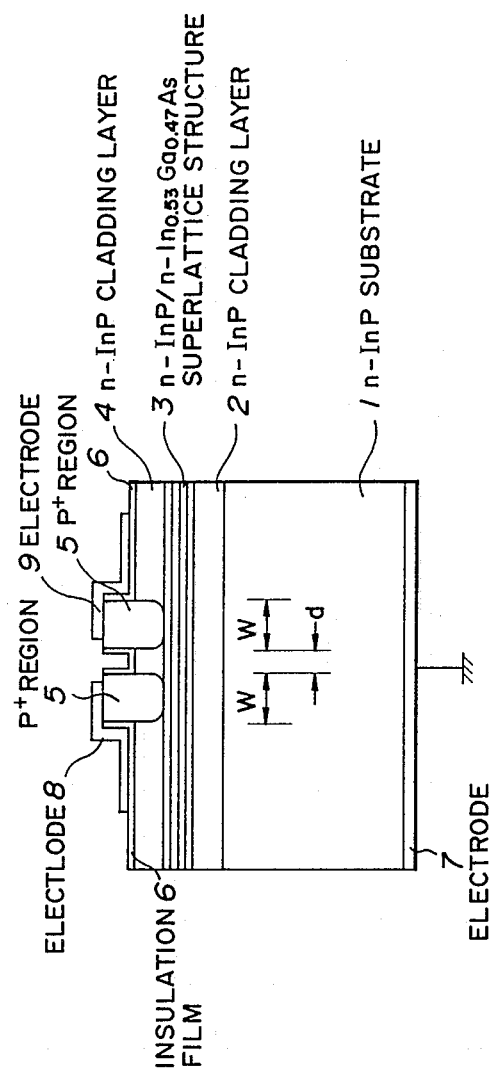
FIG. 3 is a cross sectional view cut along the line III—III in FIG. 2.

Next, an optical semiconductor device for demultiplexing wavelength multiplexed lights in an embodiment according to the invention will be explained in FIGS. 2 and 3. The optical semiconductor device is fabricated as follows. At first, an n-InP cladding layer 2 which is referred to as a first semiconductor layer, a superlattice structure 3 which is referred to as a second semiconductor layer including barriers of InP layers and wells of $In_{0.53}Ga_{0.47}As$ layers and which is for an optical waveguide and absorption layer, and an n-InP cladding layer 4 which is referred to as a third semiconductor layer are successively grown on an n-InP substrate 1. After that, the n-InP cladding layer 4 is selectively diffused with Zn and is selectively etched to provide a waveguide structure including $p^+$-regions 5. The formation of such a waveguide structure is described, for instance, on pages 790 to 792 of "Electronic Letters, 13th Sept. 1984, Vol. 20, No. 19". As a result, the $p^+$- regions 5 are protruded above one top surface of the n-InP cladding layer 4, and are covered with a $Si_3N_4$ film 6 except for the top surfaces thereof together with the n-InP cladding layer 4. Then, separate p-electrodes 8, 9 and 10 of AuZn are locally provided on the $Si_3N_4$ film 6 to be in contact with the top surfaces of the $p^+$-regions 5 thereby providing three optical waveguides 11, 12 and 13, and an n-electrode 7 of AuGe is provided on the bottom surface of the n-substrate 1. As shown in FIG. 3, each of the $p^+$-regions 5 is of a width "w" and is positioned to have a distance interval "d" from the other. As shown in FIG. 2, there are provided three of the $p^+$- regions 5 which are parallel to each other by a predetermined length. Thus, two directional couplers 14 and 15 are obtained each having a complete coupling length "L" which is determined by the width "w" and the interval "d". For this reason, the coupling efficiency of approximately one hundred percents is realized.

As clearly understood from the illustrations in FIGS. 2 and 3, the light signals 16 of three different wavelengths are demultiplexed and detected in the optical semiconductor device. The three different wavelengths are preferably ranged in 1 to 1.6 μm wavelength band which is advantageously used in an optical communication system.

Here, it is assumed that absorption edge energies which are determined by electric fields in accordance with voltages $V_1$, $V_2$ and $V_3$ applied to the waveguides 11, 12 and 13 are $E_1$, $E_2$ and $E_3$, and that the input lights 16 having wavelengths $\lambda_1$, $\lambda_2$ and $\lambda_3$ and energies $E_{\lambda 1}$ $E_{\lambda 2}$ and $E_{\lambda 3}$ are supplied in the direction of a cleaved edge plane to the optical semiconductor device.

If the equation (2) is satisfied, the wavelength multiplexed lights 16 are demultiplexed and detected to produce electric signals in the electrodes 8, 9 and 10.

$$E_{\lambda 1} > E_1 > E_{\lambda 2} > E_2 > E_{\lambda 3} E_3 \tag{2}$$

That is, the lights of the wavelengths $\lambda_1$, $\lambda_2$ and $\lambda_3$ are absorbed in the waveguides 11, 12 and 13, respectively, so that electric current signals corresponding to the lights of the wavelengths $\lambda_1$, $\lambda_2$ and $\lambda_3$ are obtained from the electrodes 8, 9 and 10.

In the embodiment, a semiconductor material of InGaAsP system which is advantageously used in an optical communication system of 1 to 1.6 μm wavelength band was adopted. In place of the semiconductor material, AlGaAs system which is advantageously used in an optical communication system of less than 1 μm wavelength may be adopted.

Now, principle and operation of the invention will be explained as follows.

A plurality of waveguides comprise a waveguide layer including a superlattice structure, and electrodes are provided on the waveguides, respectively, so that different voltages are applied to the waveguides. Therefore, absorption energies are controlled to be different from the other in the respective waveguide regions to which different electric fields are applied in accordance with the aforementioned Stark effect.

Two of the waveguides are proximate to the other with a distance interval of several μm, thereby providing a directional coupler so that the light of one waveguide is transferred to the other waveguide. A length of a directional coupler by which the coupling of one hundred percents is realized is defined as "a complete coupling length." Such a complete coupling length is determined by a width of the waveguides and a distance interval between the waveguides. In general, the distance interval is narrowered in the case where the complete coupling length is required to be short.

In operation, when wavelength multiplexed lights are supplied to a first waveguide of an optical semiconductor device, light having energy larger than energy determined by an applied electric field is absorbed in the first waveguide, while other remaining lights are waveguided through the first waveguide. The other remaining lights are transferred through a directional coupler having a complete coupling length to a second waveguide, and light having energy larger than energy determined by an applied electric field is absorbed in the second waveguide. In the same manner, other remaining lights are waveguided through the second waveguide. Thus, this demultiplexing process is repeated by the number of multiplexed wavelengths. In other words, when wavelength multiplexed lights of N (N=3, 4, 5 -----) wavelengths are received to be demultiplexed in the optical semiconductor device, it must comprise waveguides of N and directional couplers of (N−1) each having the complete coupling length.

In a case where a directional coupler is of a complete coupling length, the coupling efficiency of approximately one hundred percent is realized between waveguides. As clearly understood from the explanations in the aforementioned embodiment, no proton implantation is applied to an optical semiconductor device so that electrical crosstalk is reduced and a reliability of the device is enhanced.

Figure 4:
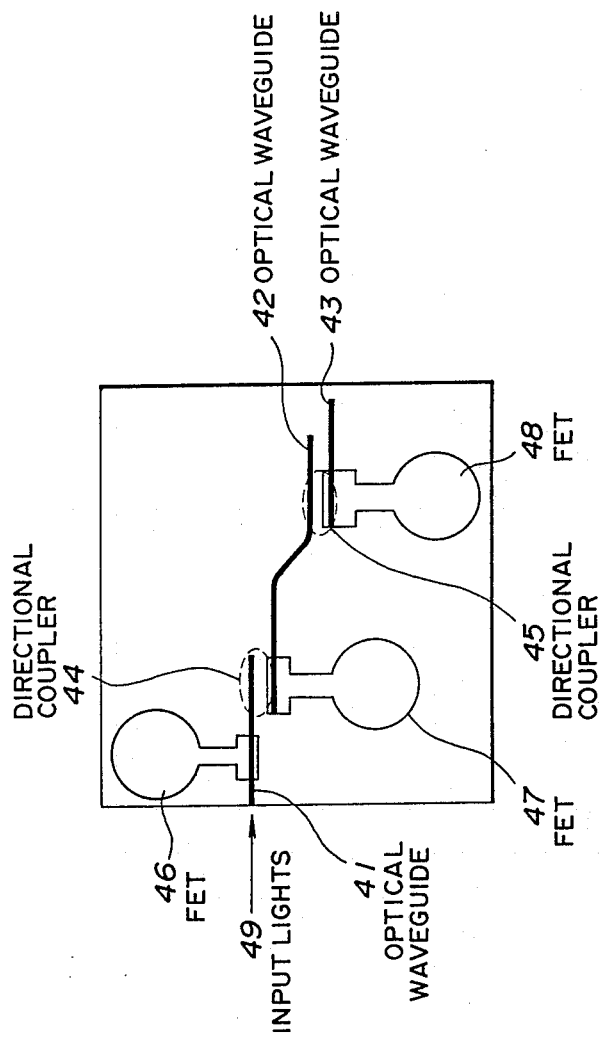
FIG. 4 is an explanatory diagram showing a device developed from a basic concept in the invention.

FIG. 4 shows another optical semiconductor device according to the invention. The optical semiconductor device as a structure of an opticelectro integrated circuit, and comprises three light receiving portions 41, 42 and 43, two directional couplers 44 and 45, and three field effect transistors (FETs) 46, 47 and 48. As clearly seen in FIG. 4, the optical semiconductor device is developed, for instance, such that optical waveguides and directional couplers are arranged on a plane of a chip together with electric circuits As a matter of course, an electric circuit is not limited to a FET.

Although the invention has been described with respect to specific embodiment for complete and clear disclosure, the appended claims are not to be limited but are to be construed as embodying all modification and alternative constructions that may occur to one skilled in the art which fairly fall within the basic teaching herein set forth.

What is claimed is:

1. An optical semiconductor device for demultiplexing wavelength multiplexed lights comprising:
   a plurality of waveguides each including first to third semiconductor layers;
   said first semiconductor layer being grown on a substrate, said second semiconductor layer being grown on said first semiconductor layer and being of a larger refractive index and a lower absorption edge energy than said first semiconductor layer and including a superlattice structure which functions as an optical absorption and waveguide layer, and said third semiconductor layer being grown on said second semiconductor layer and being of a lower refractive index and a larger absorption edge energy than said second semiconductor layer;
   a plurality of directional couplers each coupling two neighboring waveguides optically among said plurality of waveguides; and
   a plurality of electrodes for applying different voltages to said plurality of waveguides, wherein absorption edge energies are different in said plurality of waveguides in accordance with said different voltages applied across said plurality of waveguides by said plurality of electrodes.

2. An optical semiconductor device for demultiplexing wavelength multiplexed lights according to claim 1, wherein each of said plurality of waveguides includes a protruded region above the top surface of said third semiconductor layer, said protruded region being of a conduction type which is different from that of said third semiconductor layer and being in contact with a corresponding one of said plurality of electrodes.

3. An optical semiconductor device for demultiplexing wavelength multiplexed lights according to claim 1, wherein each of said plurality of directional couplers is of a complete coupling length.

4. An optical semiconductor device for demultiplexing wavelength multiplexed lights according to claim 1, wherein said plurality of waveguides are arranged such that each of said plurality of waveguides is staggered in an incident direction of said wavelength multiplexed lights, except at a corresponding one of said plurality of directional couplers, and in a direction orthogonal to said incident direction.

* * * * *

UNITED STATES PATENT AND TRADEMARK OFFICE
CERTIFICATE OF CORRECTION

PATENT NO. : 4,950,044

DATED : August 21, 1990

INVENTOR(S) : Kiko Makita

It is certified that error appears in the above-identified patent and that said Letters Patent is hereby corrected as shown below:

Col. 2, line 8, delete "s" and insert --is--.

Signed and Sealed this

Thirty-first Day of March, 1992

Attest:

HARRY F. MANBECK, JR.

*Attesting Officer*   *Commissioner of Patents and Trademarks*